Patented Mar. 6, 1923.

1,447,461

UNITED STATES PATENT OFFICE.

JOSEPH FERGUS BREWSTER, OF CLARENDON, VIRGINIA, AND WILLIAM G. RAINES, JR., OF JACKSON, MISSISSIPPI, ASSIGNORS, BY DIRECT AND MESNE ASSIGNMENTS, TO THE GOVERNMENT OF THE UNITED STATES AND TO THE PEOPLE OF THE UNITED STATES.

METHOD FOR EMPLOYING DECOLORIZING CARBONS AND OTHER ADSORBING MATERIALS.

No Drawing. Application filed April 19, 1921. Serial No. 462,764.

(FILED UNDER THE ACT OF MARCH 3, 1883, 22 STAT. L., 625.)

*To all whom it may concern:*

Be it known that we, JOSEPH FERGUS BREWSTER, a citizen of the United States of America and an employee of the Department of Agriculture, residing in Clarendon, Virginia, and WILLIAM G. RAINES, Jr., a citizen of the United States of America, residing in Jackson, Mississippi, have jointly invented a Method for Employing Decolorizing Carbons and Other Adsorbing Materials.

This application is made under the act of March 3, 1883, chapter 143 (22 Stat., 625), and the invention herein described and claimed may be used by the Government of the United States, its officers and employees, and by any person in the United States without payment to us of any royalty thereon. We hereby dedicate the same to the free use of the Government and the people of the United States.

The object of our invention is to improve the purifying and decolorizing effect of animal charcoal or other decolorizing carbons, diatomaceous earth, fuller's earth, and like adsorbing materials, when these are used for the purpose of purifying or decolorizing liquids or solutions, particularly saccharine liquors such as cane juice and cane syrup and molasses in the manufacture and refining of cane sugar and syrup, the juice, syrup and molasses obtained from the sugar beet, maltose, glucose and sweet potato syrup and the like, by adjusting the hydrogen or hydroxyl ion concentration of the liquid to be purified or decolorized to an optimum by addition of acid or alkali as required.

A further object of the invention is to provide means for controlling conditions of acidity or alkalinity during or after treatment of liquids with adsorbing material so that undue decomposition is prevented.

The principle of our invention is based upon the discovery that colloidal impurities and coloring matters occurring in the above named saccharine products are coagulated, precipitated or otherwise rendered more thoroughly adsorbed upon decolorizing carbons and other adsorbent material by adjustment of the hydogen or hydroxyl ion concentration to an optimum for the particular liquid to be purified or decolorized.

The novelty of our invention consists in adding acid or alkali, as the case requires, to the liquid to be purified or decolorized until the particular hydrogen or hydroxyl ion concentration, or, in other words, the particular acidity or alkalinity, has been reached at which the impurities and coloring matters are most readily removed by the adsorbent. The optimum reaction at which any given liquid may be thus purified or decolorized is readily found by experiment, the well known colorimetric or electrometric methods for the determination of hydrogen or hydroxyl ions being employed.

A further novelty of the process lies in neutralizing acidity or alkalinity in such a way that the enhanced purifying or decolorizing effect of the adsorbent is not lost. We accomplish this by employing acids and alkalis which, by combining, form insoluble compounds, the latter being removed with the adsorbing material. For instance, when we acidify with phosphoric acid we neutralize with lime, obtaining insoluble calcium phosphate. If we use sulphuric acid we neutralize with barium hydroxide or barium carbonate. In cases where it becomes necessary to treat in alkaline mediums the process may be reversed. That is, alkalinity is obtained by means of lime which in turn is neutralized back with phosphoric acid; or barium oxide or hydroxide with sulphuric acid. This is an advantage over using acids and bases which form soluble compounds because the latter can not be readily removed and would remain throughout later treatment.

In the operation of our process for improving the effect of an adsorbing medium such as decolorizing carbon the reaction of the liquid to be purified or decolorized is adjusted by the addition of acid such as hydrochloric, sulphuric, phosphoric, acetic, or other acid, depending on the acidity to be obtained, or of alkali such as sodium or potassium hydroxide, sodium carbonate, lime, etc., for alkalinity. For the treatment of saccharine liquids such as those from the sugar cane or sugar beet, maltose or glucose syrup and the like, it was found that with decolorizing carbons, best purification and decolorization takes place at a hydrogen ion concentration of about p H-4 (Sorensens scale) although good results may also be obtained at about p H-5. When the desired hydrogen or hydroxyl ion concentration is reached, the liquid is treated with a quantity of decolorizing carbon or other adsorbent sufficient to remove colloidal impurities and coloring matter present in the liquid and filtered or otherwise separated from adsorbent either hot or cold as required.

Some sugars are decomposed or hydrolyzed when their solutions are heated with acids. This applies particularly to solutions of sucrose, the principal sugar of sugar cane and sugar beet. The extent of inversion, which means loss of sucrose, depends upon three factors, namely, (1) the strength of acid employed or in reality, the hydrogen ion concentration of the solution, (2) the temperature to which the acidified solution is heated and (3) the length of time the acidified sucrose solution is heated. In applying our invention to the purification and decolorization of cane or sugar beet products we take these factors into account and adjust the hydrogen ion concentration to about p H-4 at which there is little inversion of sucrose and at which good practical results can be obtained. To control both the factors of hydrogen ion concentration and time to which a liquid is exposed to acid reaction we proceed somewhat as follows: The liquid to be purified or decolorized with decolorizing carbon may, for instance, be acidified to about p H-4 with an acid such as phosphoric or an acid reacting substance such as calcium acid phosphate. It is then treated with the carbon and heated to the desired temperature (80 to 100° C.) at the same time being stirred as in the usual practice. Adsorption of coloring matter and other impurities by the carbon occurs and the free acidity is then partially neutralized by adding lime until the hydrogen ion concentration has been reduced to about p H-6 or 6.5. Where phosphoric acid or calcium acid phosphate has been used the excess phosphoric acid is rendered insoluble by addition of lime and is precipitated as tricalcium phosphate, which may then be removed with the carbon by filtration.

For the purification and decolorization of solutions of many other substances by means of adsorbents it is not always necessary to control so carefully acidity or other factors. This is particularly true in the case of glucose solutions or syrups. In the case of maltose solutions there is less danger of inversion at p H-4 than with surcose solutions.

By slightly acidifying saccharine solutions before these are treated with an adsorbing medium such as decolorizing carbon, diatomaceous earth, etc., for the purpose of removing coloring matters and other impurities the bleaching or decolorizing action of the adsorbent is greatly enhanced. A much greater decolorizing effect is obtained at p H-4 than at p H-5, and much greater at p H-5 than at p H-7 (neutrality) or at p H-8 (slightly alkaline).

*Examples.*

1. A dilute sweet potato syrup containing sucrose, maltose and possibly a small amount of glucose, and of a deep brown color, was divided into three portions, one of which was acidified to p H-4, one neutralized to p H-7, and the other rendered alkaline, p H-8. These solutions were then brought just to boiling after 1 per cent of their weight of decolorizing carbon had been added and then immediately filtered. The solution at p H-4 by this treatment was rendered a pale straw yellow almost white. That at p H-7 showed very slight decolorization while at p H-8, or alkaline, the solution was actually darkened by the original addition of alkali and none of the color seemed to be removed by treatment with decolorizing carbon and filtering.

2. Sugar cane juice containing sucrose and a small amount of invert sugar was treated with decolorizing carbon, heated and filtered, after the hydrogen ion concentration of several portions had been adjusted, respectively, to p H-4, p H-5.4, p H-7, and p H-8. Colorimetric readings on the several filtrates showed that the decolorization was greatest in the solution with the highest acidity, p H-4, and lowest in the slightly alkaline solution, also that removal of color progressed with increase of acidity.

We claim:

A method for employing decolorizing carbons and other adsorbing materials in a more efficient manner, consisting in adding to the liquid to be purified and decolorized by treatment with an adsorbing material, a sufficient quantity of acid to increase the acidity of said liquid to a hydrogen ion concentration of about p H-4, in treating such acidified liquid with adsorbing material, and subsequently neutralizing the acidity of said liquid by adding alkali.

JOSEPH FERGUS BREWSTER
WILLIAM G. RAINES, Jr.